(12) United States Patent
Arnold et al.

(10) Patent No.: US 10,734,898 B1
(45) Date of Patent: Aug. 4, 2020

(54) MULTI-LEVEL SWITCHING POWER CONVERTERS INCLUDING BYPASS TRANSISTORS AND ASSOCIATED METHODS

(71) Applicant: Maxim Integrated Products, Inc., San Jose, CA (US)

(72) Inventors: Cory B. Arnold, Tempe, AZ (US); Ilija Jergovic, Palo Alto, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/020,289

(22) Filed: Jun. 27, 2018

Related U.S. Application Data

(60) Provisional application No. 62/525,652, filed on Jun. 27, 2017.

(51) Int. Cl.
 *H02M 3/158* (2006.01)
 *H02M 1/088* (2006.01)
 *H02M 1/00* (2006.01)

(52) U.S. Cl.
 CPC .......... *H02M 3/158* (2013.01); *H02M 1/088* (2013.01); *H02M 2001/0048* (2013.01)

(58) Field of Classification Search
 CPC .... H02M 3/158; H02M 3/1584; H02M 3/155; H02M 3/156; H02M 3/157
 USPC .......................................... 323/271, 282–285
 See application file for complete search history.

(56) References Cited

U.S. PATENT DOCUMENTS

| | | | | |
|---|---|---|---|---|
| 9,160,232 | B2 * | 10/2015 | Thomas | H02M 7/483 |
| 10,050,515 | B1 * | 8/2018 | Chakraborty | H02M 1/32 |
| 10,075,080 | B1 * | 9/2018 | Scoones | H02M 3/1588 |
| 2015/0311822 | A1 * | 10/2015 | Ma | H02M 7/483 363/98 |
| 2016/0261189 | A1 * | 9/2016 | Lidsky | H02M 3/158 |
| 2017/0244321 | A1 * | 8/2017 | Phillips | H03K 17/102 |
| 2018/0097453 | A1 * | 4/2018 | Xu | H02J 3/38 |

* cited by examiner

*Primary Examiner* — Nguyen Tran
(74) *Attorney, Agent, or Firm* — Lathrop GPM LLP

(57) ABSTRACT

A multi-level switching power converter includes a string of N upper transistors and a string of N lower transistors, where N is an integer greater than one. The N upper transistors are electrically coupled in series between a first power node and a switching node, and the N lower transistors are electrically coupled in series between the switching node and a reference node. The multi-level switching power converter further includes N−1 flying capacitors, an inductor, a bypass transistor, and a controller. The bypass transistor is electrically coupled between the switching node and the reference node. The controller is configured to (a) control switching of the N upper transistors and the N lower transistors and (b) cause the bypass transistor to operate in its on state in response to all of the N lower transistors operating in their respective on states.

18 Claims, 12 Drawing Sheets

MULTI-LEVEL SWITCHING POWER CONVERTERS INCLUDING BYPASS TRANSISTORS AND ASSOCIATED METHODS

RELATED APPLICATIONS

This application claims benefit of priority to U.S. Provisional Patent Application Ser. No. 62/525,652, filed Jun. 27, 2017, which is incorporated herein by reference.

BACKGROUND

There is substantial need for switching power converters to convert high voltage to low voltage. For example, power distribution busses in enterprise-grade information technology equipment commonly operate at a relatively high voltage, such as 48 volts or 54 volts, to help minimize magnitude of current carried by these busses. Many loads in information technology equipment, however, operate at a low voltage. For instance, modern microprocessors often include a processor core that operates at a voltage of around one volt, and modern electronic memory devices typically operate at a voltage of less than two volts. Consequently, switching power converters are required in information technology equipment to convert high voltage to low voltage.

As another example, automotive power distribution busses commonly operate at a nominal voltage of around 14 volts during automobile operation, and switching of automobile electrical loads may cause power distribution buss voltage to significantly exceed 14 volts for short time periods. Many automobile electrical loads, however, require a much smaller voltage, such 3.3 volts. Consequently, switching power converters are also required in automobiles to convert high voltage to low voltage.

A two-level buck converter is capable of converting high voltage to low voltage. However, switching transistors in a two-level buck converter must have a high voltage rating if the two-level buck converter is to be used in high voltage applications. A transistor having a high voltage rating typically has a higher on-resistance for a given area than an otherwise identical transistor having a low voltage rating. Such high on-resistance causes significant resistive power loss at high current levels. Consequently, a two-level buck converter designed for high voltage operation will typically be less efficient at high current levels than an otherwise identical two-level buck converter designed for low-voltage operation.

A multi-level buck converter can be used in place of a two-level buck converter to reduce voltage across transistors, where in this document, the term "multi-level" means three or more levels. For example, FIG. 1 illustrates a conventional four-level buck switching power converter 100 based on the Meynard topology which includes three upper transistors 102, three lower transistors 104, two flying capacitors 106, an inductor 108, an output capacitor 110, and a controller 112. In this document, specific instances of an item may be referred to by use of a numeral in parentheses (e.g., upper transistor 102(1)) while numerals without parentheses refer to any such item (e.g., upper transistors 102). Upper transistors 102 are electrically coupled in series between a power node 114 and a switching node 116, and lower transistors 104 are electrically coupled in series between switching node 116 and a reference node 118. Flying capacitor 106(1) is electrically coupled between a first upper node 122(1) and a second lower node 124(2), and flying capacitor 106(2) is electrically coupled between a second upper node 122(2) and a first lower node 124(1). Inductor 108 is electrically coupled between switching node 116 and a power node 120. An input electric power source 126 having a voltage $V_{in}$ is electrically coupled between power node 114 and reference node 118, and a load 128 is electrically coupled between power node 120 and reference node 118.

Controller 112 is configured to control switching of upper transistors 102 such that the upper transistors switch out of phase with each other and with a duty cycle that achieves a desired magnitude of an output voltage $V_{out}$. Controller 112 is also configured to control switching of lower transistors 104 such that each lower transistor 104 switches in a complementary manner with a respective upper transistor 102. It can be determined that maximum voltage across each upper transistor 102 and that maximum voltage across each lower transistor 104 is equal to $V_{in}/3$. Accordingly, the four-level topology of buck converter 100 enables each transistor 102 and 104 to have a significantly lower voltage rating (i.e., $V_{in}/3$) than the magnitude of input voltage $V_{in}$.

DETAILED DESCRIPTION OF THE EMBODIMENTS

Figure 1:
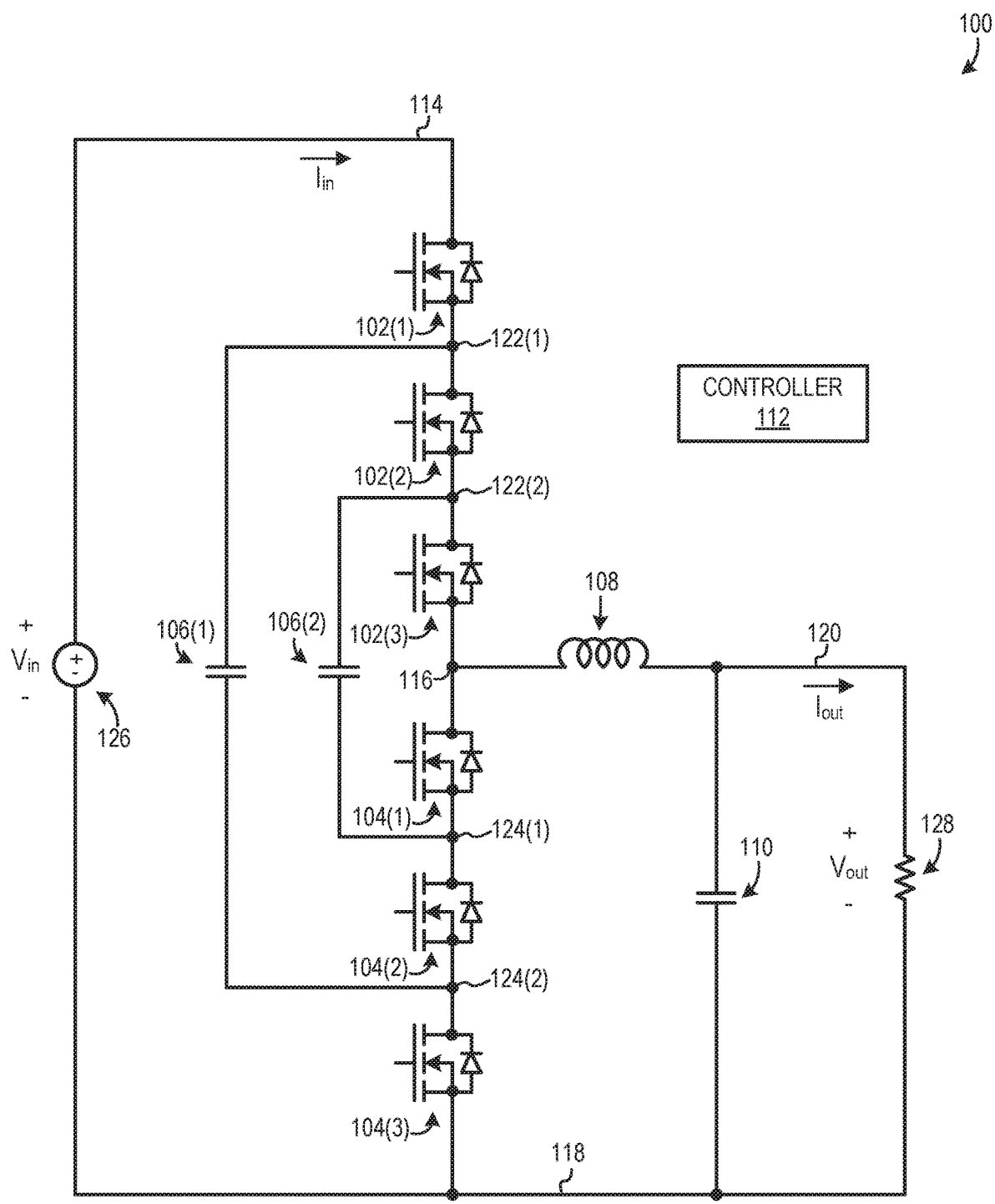
FIG. 1 illustrates a conventional four-level buck switching power converter.

Applicant has determined that a conventional multi-level switching power converter may suffer from significant resistive power losses during operation at low duty cycles associated with converting high input voltage magnitude to low output voltage magnitude. For example, when conventional four-level buck converter 100 of FIG. 1 operates with a duty cycle of less than 33%, all three lower transistors 104 operate in their respective on states during three out of six sub-periods of each switching period, such that current flows through all three lower transistors for a significant portion of each switching period. The collective on-resistance of lower transistors 104 is relatively large due to their series electrical connection, and therefore, significant power is dissipated in lower transistors 104 when current of large magnitude flows through all three lower transistors 104. Accordingly, significant power is dissipated in lower transistors 104 when buck converter 100 is operating at low duty cycle and supplying an output current $I_{out}$ having a large magnitude.

Applicant has developed multi-level switching power converters and associated methods which at least partially overcome the problems discussed above. These multi-level switching power converters include a bypass transistor electrically coupled in parallel with the switching power converter's lower transistors, and the bypass transistor is caused to operate in its on state in response to all of the lower transistors operating in their respective on states. The bypass transistor provides a relatively low-resistance current path in parallel with the lower transistors, thereby reducing current flowing through the lower transistors and associated power dissipation in the lower transistors. In this document, a transistor is in its on state when the transistor is being controlled to be its conductive state, and a transistor is in its off state when the transistor is being controlled to be in its non-conductive state. For example, an n-channel enhancement MOSFET in its on state when a voltage above the transistor's threshold voltage is applied between the transistor's gate and source, and the transistor is in its off state when a voltage below the transistor's threshold voltage is applied between the transistor's gate and source.

Figure 2:
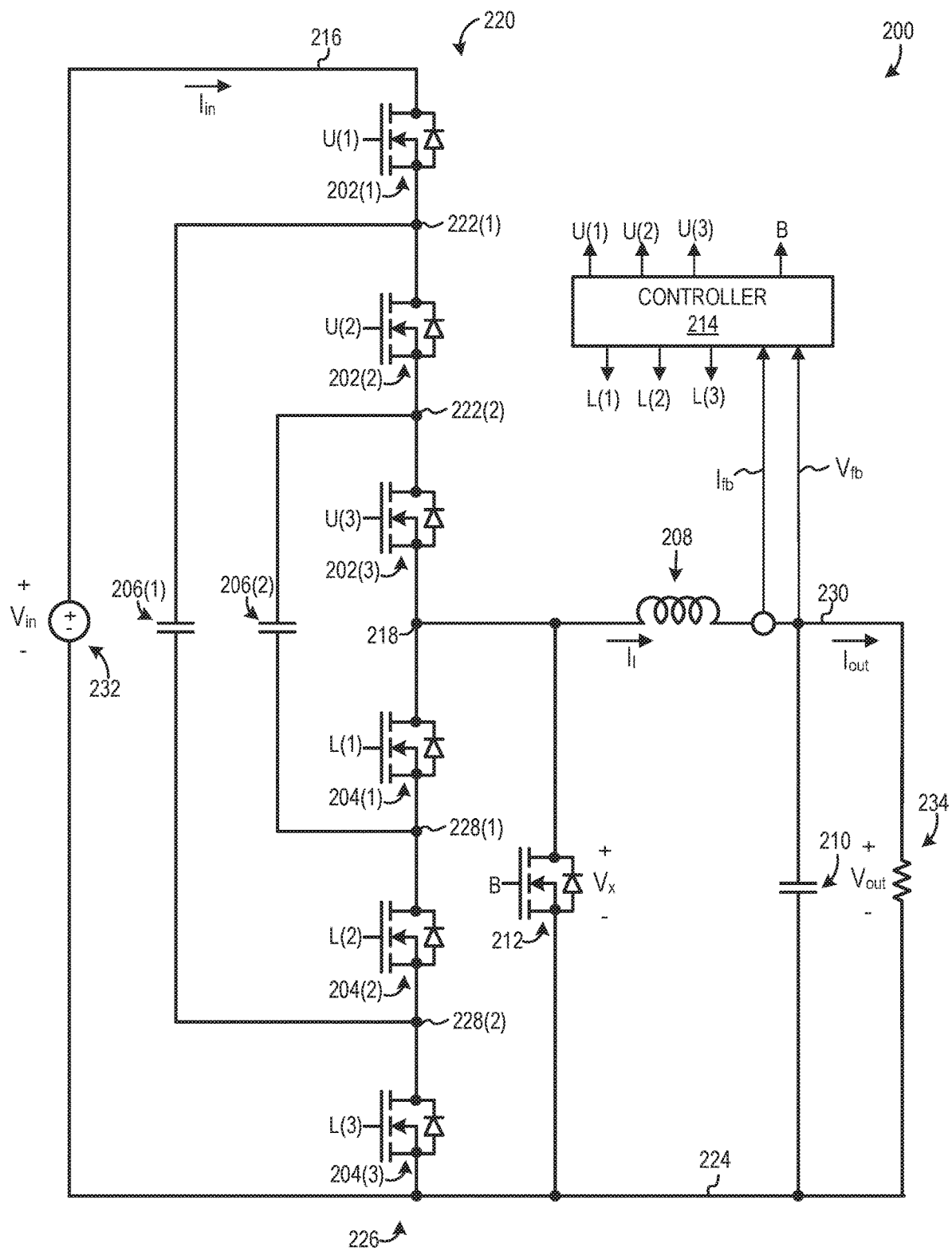
FIG. 2 illustrates a four-level buck switching power converter including a bypass transistor, according to an embodiment.

FIG. 2 illustrates a four-level buck switching power converter 200 including three upper transistors 202, three lower transistors 204, two flying capacitors 206, an inductor 208, an output capacitor 210, a bypass transistor 212, and a controller 214. Upper transistors 202 are electrically coupled in series between a first power node 216 and a switching node 218 to form an upper string 220. Specifically, first upper transistor 202(1) is electrically coupled between first power node 216 and a first upper node 222(1), second upper transistor 202(2) is electrically coupled between first upper node 222(1) and a second upper node 222(2), and third upper transistor 202(3) is electrically coupled between second upper node 222(2) and switching node 218. Lower transistors 204 are electrically coupled in series between switching node 218 and a reference node 224 to form a lower string 226. Specifically, first lower transistor 204(1) is electrically coupled between switching node 218 and a first lower node 228(1), second lower transistor 204(2) is electrically coupled between first lower node 228(1) and a second lower node 228(2), and third lower transistor 204(3) is electrically coupled between second lower node 228(2) and reference node 224. Although upper transistors 202, lower transistors 204, and bypass transistor 212 are shown as being n-channel enhancement MOSFETs, one or more of these transistors could be replaced with, or supplemented by, a different type of transistor, such as a p-channel enhancement MOSFET or even a bipolar junction transistor (BJT), without departing from the scope hereof. Upper transistors 202, lower transistors 204, and bypass transistor 212 can be formed of, for example, silicon, gallium nitride, and/or another semiconductor material.

Each flying capacitor 206 is electrically coupled between a respective upper node 222 of upper string 220 and a respective lower node 228 of lower string 226. In particular, first flying capacitor 206(1) is electrically coupled between first upper node 222(1) and second lower node 228(2), and second flying capacitor 206(2) is electrically coupled between second upper node 222(2) and first lower node 228(1). Inductor 208 is electrically coupled between switching node 218 and a second power node 230, and output capacitor 210 is electrically coupled between second power node 230 and reference node 224. Bypass transistor 212 is electrically coupled in parallel with lower transistors 204 between switching node 218 and reference node 224. An input electric power source 232 having a voltage $V_{in}$ is electrically coupled between first power node 216 and reference node 224, and a load 234 is electrically coupled between second power node 230 and reference node 224. While not required, it is anticipated that input electric power source 232 and load 234 will typically not be part of switching power converter 200.

Controller 214 is configured to generate a respective upper control signal U for each upper transistor 202, to control switching of upper transistors 202 to transfer electric power from electric power source 232 to load 234. Each upper control signal U controls switching of a respective upper transistor 202. In particular, upper control signal U(1) controls switching of first upper transistor 202(1), upper control signal U(2) controls switching of second upper transistors 202(2), and upper control signal U(3) controls switching of third upper transistor 202(3). Controller 214 is also configured to generate upper control signals U such that each upper transistor 202 switches out of phase with each other upper transistor 202. For example, in certain embodiments, controller 214 generates each upper control signals U 120 degrees out of phase with each other upper control signal U, such that each upper transistor 202 switches 120 degrees out of phase with other upper transistor 202.

In some embodiments, controller 214 is further configured to generate upper control signals U and thereby control switching of upper transistors 202 to regulate at least one of (a) magnitude of voltage $V_{in}$ at first power node 216, (b) magnitude of voltage $V_{out}$ at second power node 230, (c) magnitude of current $I_{in}$ flowing into switching power converter 200, and (d) magnitude of load current $I_{out}$ flowing out of switching power converter 200. Controller 214 achieves such regulation using a pulse width modulation (PWM) or a pulse frequency modulation (PFM) control technique in response to one or more of a voltage feedback signal $V_{fb}$ and a current feedback signal $I_{fb}$, in certain embodiments. In some embodiments, voltage feedback signal $V_{fb}$ represents magnitude of voltage $V_{out}$ at second power node 230 and current feedback signal $I_{fb}$ represents magnitude of current $I_i$ through inductor 208. However, voltage feedback signal $V_{fb}$ and current feedback signal $I_{fb}$ could be modified to represent a different voltage and current, respectively. Additionally controller 214 could alternately be configured to achieve regulation using one or more additional or different parameters without departing from the scope hereof.

Lower transistors 204 perform a freewheeling function, i.e., each lower transistor 204 provides a path for current flowing through inductor 208 when a respective upper transistor 202 switches from its on state to its off state. Accordingly, controller 214 is further configured to generate a respective lower control signal L for each lower transistor 204, to control switching of lower transistors 204 such that they perform a freewheeling function. Each lower control signal L controls switching of a respective lower transistor 204. In particular, lower control signal L(1) controls switching of first lower transistor 204(1), lower control signal L(2) controls switching of second lower transistor 204(2), and lower control signal L(3) controls switching of third lower transistor 204(3). Controller 214 is also configured to generate lower control signals L such that each lower transistor 204 switches in a complementary manner with a respective upper transistor 202. Specifically, controller 214 is configured to generate lower control signals L such that (a) first lower transistor 204(1) switches in a complementary manner with third upper transistor 202(3), (b) second lower transistor 204(2) switches in a complementary manner with second upper transistor 202(2), and (c) third lower transistor 204(3) switches in a complementary manner with first upper transistor 202(1).

Controller 214 is further configured to generate a bypass control signal B to control switching of bypass transistor 212 to cause bypass transistor 212 to operate in its on state in response to all lower transistors 204 operating in their respective on states. While not required, bypass transistor 212 typically has an on-resistance, i.e., resistance of the transistor when the transistor is in its on state, that is less than a sum of respective on-resistances of lower transistors 204. In these embodiments, bypass transistor 212 provides a relatively low-resistance current path in parallel with lower transistors 204, thereby reducing current flowing through lower transistors 204 and associated power dissipation in lower transistors 204, when all lower transistors 204 are operating in their respective on states. Consequently, use of bypass transistor 212 in switching power converter 200 may enable lower transistors 204 to have a relatively high on-resistance without unduly degrading efficiency of switching power converter 200, thereby promoting low cost and small size of switching power converter 200.

Each upper transistor 202 and each lower transistor 204 need only have a maximum voltage rating of $V_{in}/3$. Bypass transistor 212 need only have a maximum voltage rating of $V_{in}/3$ when duty cycle of upper transistors 202 is less than 33%. Additionally, first flying capacitor 206(1) need only have a maximum voltage of $(2/3)*V_{in}$, and second flying capacitor 206(2) need only have a maximum voltage rating of $V_{in}/3$. Flying capacitors 206 are selected, for example, to have sufficiently large capacitance values such that voltage across each flying capacitor 206 remains relatively constant, and also to have a sufficiently low equivalent series resistance (ESR) to prevent excessive heating, during anticipating operating conditions of switching power converter 200.

In some embodiments, controller 214 is configured to generate bypass control signal B such bypass transistor 212 switches from its off state to its on state while one or more of lower transistors 204 switch from their respective off states to their respective on states, such that switching of bypass transistor 212 is synchronized with switching of lower transistors 204. In some other embodiments, however, controller 214 is configured to generate bypass control signal B such that bypass transistor 212 switches at a different time than lower transistors 204. For example, in a particular embodiment, controller 214 is configured to generate bypass control signal B such that (a) bypass transistor 212 switches from its off state to its on state a first amount of time after each lower transistor 204 is operating in its on state and (b) bypass transistor 212 switches from its on state to its off state a second amount of time before one or more lower transistor 204 switches from its on state to its off state. Such offset in switching of bypass transistor 212 relative to switching of lower transistors 204 may minimize switching losses incurred during switching of bypass transistor 212.

It should be appreciated that the benefits of using bypass transistor 212 are greatest at low duty cycle operation because the amount of time that first bypass transistor 212 operates in its on state is inversely proportional to upper transistor 202 duty cycle. Additionally, bypass transistor 212 will not operate in its on state if duty cycle of upper transistors is 1/N or greater, where N is the number of upper transistors 202, since all lower transistors 204 will never simultaneously be in their respective on states during this condition. Additionally, maximum voltage across bypass transistor 212 increases if duty cycle of upper transistors is 1/N or greater, thereby potentially necessitating that bypass transistor 212 has a higher voltage rating. Accordingly, in some embodiments, controller 214 is further configured to constrain duty cycle of upper transistors 202 to less than 1/N.

Figure 3:
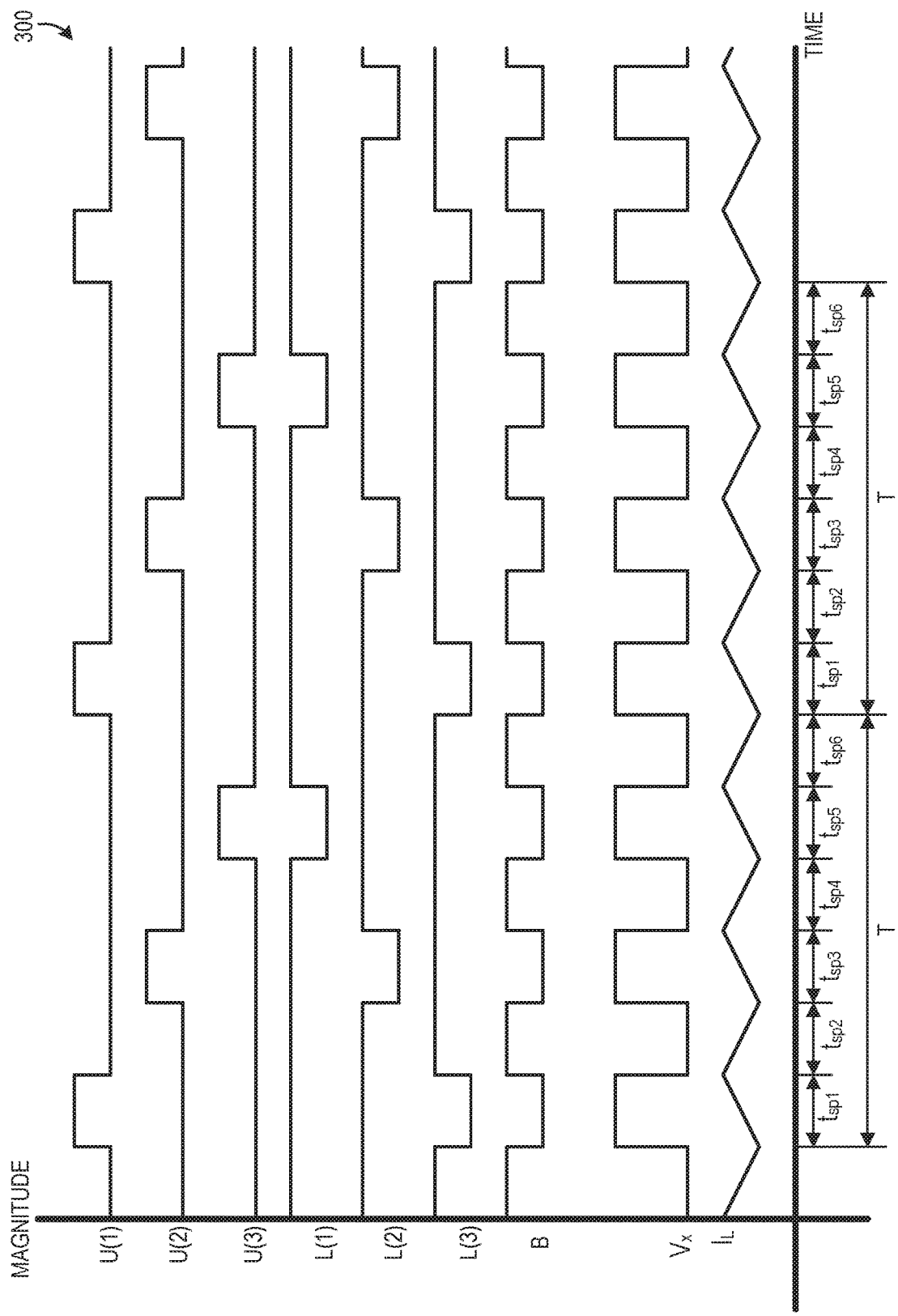
FIG. 3 shows waveforms illustrating one example of operation of an embodiment of the FIG. 2 switching power converter with a duty cycle of upper transistors being about 17%.

FIG. 3 shows waveforms 300 illustrating one example of operation of switching power converter 200 with a duty cycle of upper transistors 202 being about 17%. In this example, each upper control signal U, each lower control signal L, and bypass control signal B is in it asserted state when it is logic high. Signal $V_x$ represents voltage at switching node 218. Controller 214 generates upper control signals U such that each upper control signal is 120 degrees out of phase with each other upper control signal. Additionally, controller 214 generates lower control signals L such that each lower control signal L is asserted/de-asserted in a complementary manner with a respective upper control signal U. For example, lower control signal L(1) is de-asserted when upper control signal U(3) is asserted, and lower control signal L(1) is asserted when upper control signal U(3) is de-asserted.

Controller 214 additionally asserts bypass control signal B solely when all of lower control signals L are asserted, such that bypass transistor 212 is in its on state solely when all of lower transistors 204 are in their respective on states. Consequently, bypass transistor 212 is on in each of sub-periods $t_{sp2}$, $t_{sp4}$, and $t_{sp6}$ of period T. First flying capacitor 206(1) is charged during sub-period $t_{sp1}$ and discharged during sub-period $t_{sp3}$, and second flying capacitors 206(2) is charged during sub-period $t_{sp3}$ and discharged during sub-period $t_{sp5}$. Inductor 208 is charged during sub-periods $t_{sp1}$, $t_{sp3}$, and $t_{sp5}$, and inductor 208 is discharged during sub-periods $t_{sp2}$, $t_{sp4}$, and $t_{sp6}$.

Figure 4:
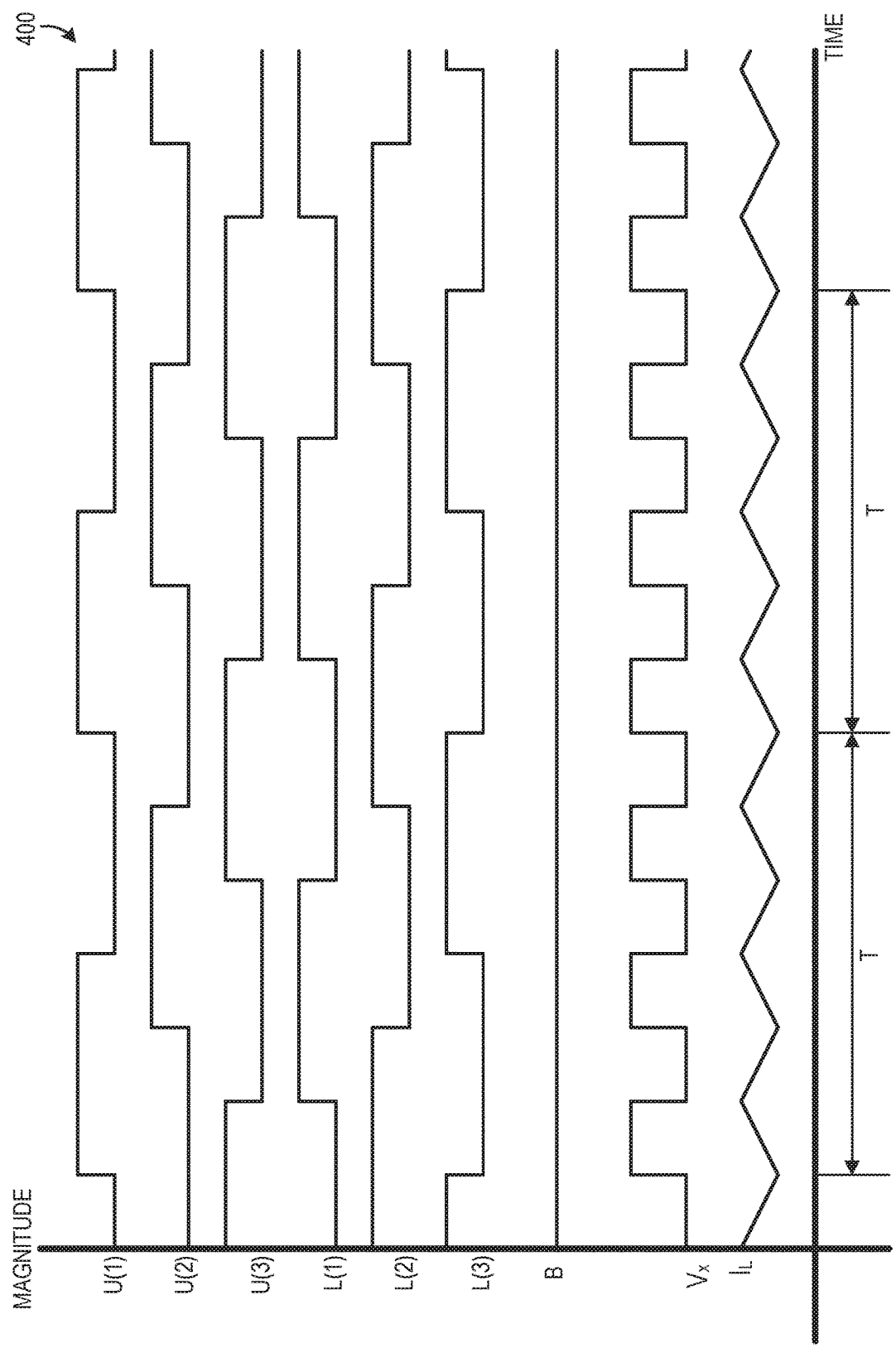
FIG. 4 shows waveforms illustrating one example of operation of an embodiment of the FIG. 2 switching power converter with a duty cycle of upper transistors being 50%.

For comparison purposes, FIG. 4 shows waveforms 400 illustrating one example of operation of an embodiment where controller 214 permits operation at duty cycles of upper transistors 202 greater than or equal to 33%. Duty cycle is 50% in this example, and as can be observed, there is no sub-period within period T where all of lower signals L are asserted. Consequently, bypass control signal B is never asserted in this example.

Figure 5:
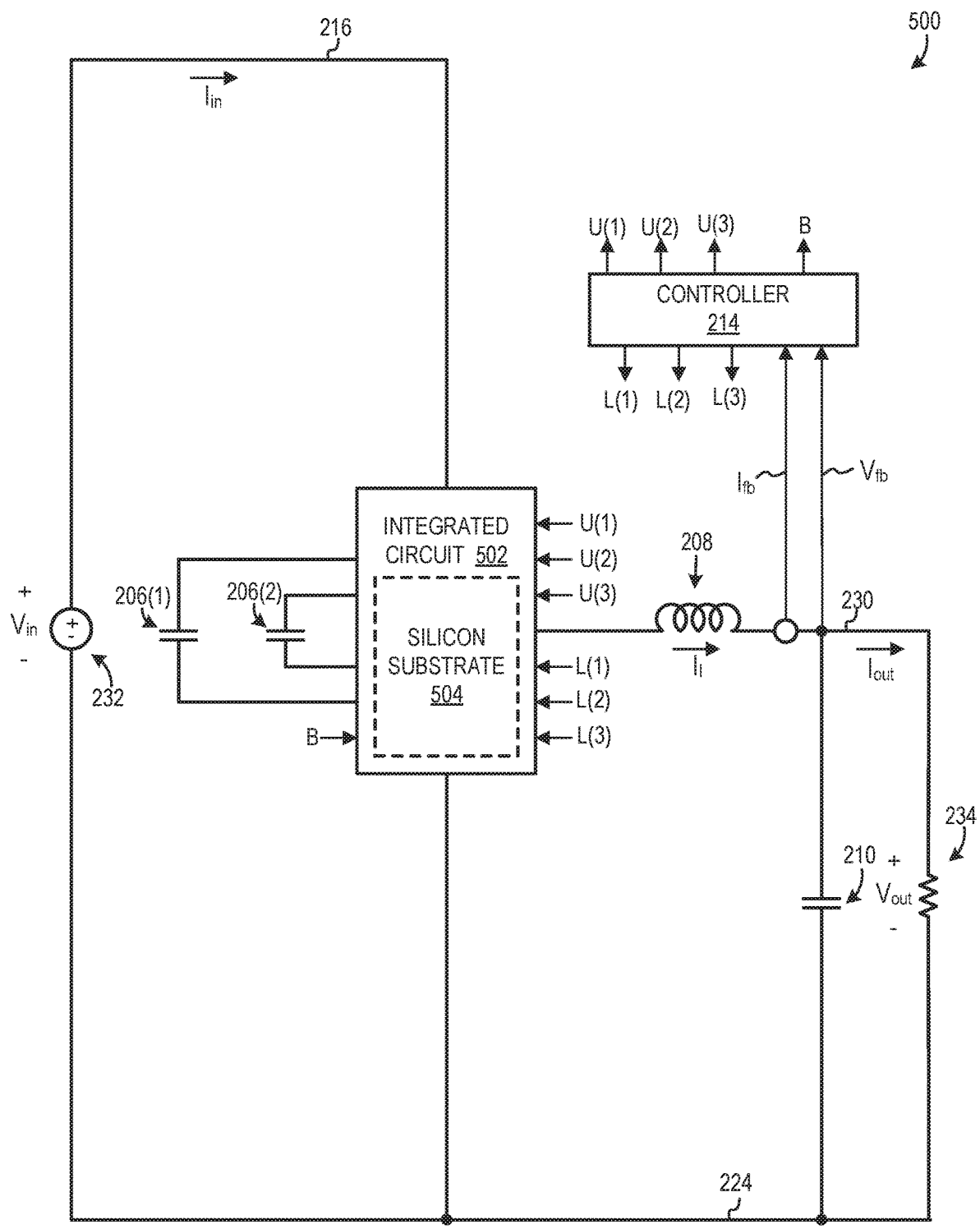
FIG. 5 illustrates a four-level buck switching power converter like that of FIG. 2, but with lower transistors, upper transistors, and a bypass transistor housed in a common integrated circuit package, according to an embodiment.

In certain embodiments of switching power converter 200, two or more components of the switching power converter are co-packaged. For example, FIG. 5 illustrates a four-level buck switching power converter 500 which is like switching power converter 200 of FIG. 2, but with lower transistors 202, upper transistors 204, and bypass transistor 212 housed in a common integrated circuit package 502. The transistors are not shown in FIG. 5 to promote clarity. In some embodiments, lower transistors 202, upper transistors 204, and bypass transistor 212 are formed on a common silicon substrate 504 within integrated circuit package 502. Presence of bypass transistor 212 in switching power converter 500 may enable size of silicon substrate 504 to be reduced without reducing efficiency, relative to an otherwise identical version of switching power converter 500 without bypass transistor 212. Alternately or additionally, presence of bypass transistor 212 in switching power converter 500 may enable efficiency to be increased relative to an otherwise identical version of switching power converter 500 without bypass transistor 212 by reducing resistive dissipation in lower transistors 204, in a manner analogous to that discussed above with respect to FIG. 2. In certain alternate embodiments, one or more of controller 214, flying capacitors 206, and inductor 208 are additionally housed in integrated circuit package 502.

Figure 6:
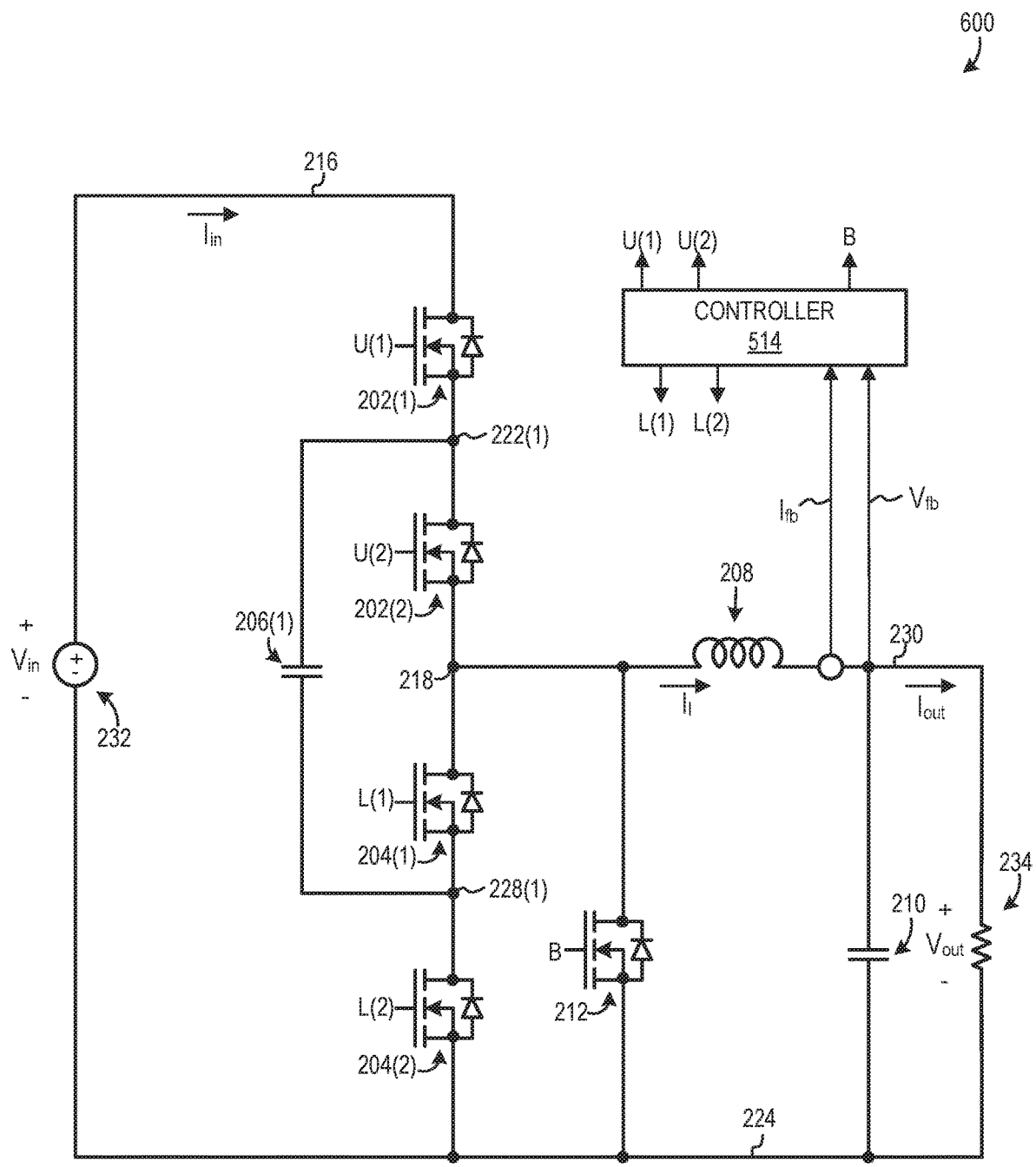
FIG. 6 illustrates a switching power converter which is like that of FIG. 2, but including two upper transistors, two lower transistors, and one flying capacitor, according to an embodiment.
Figure 7:
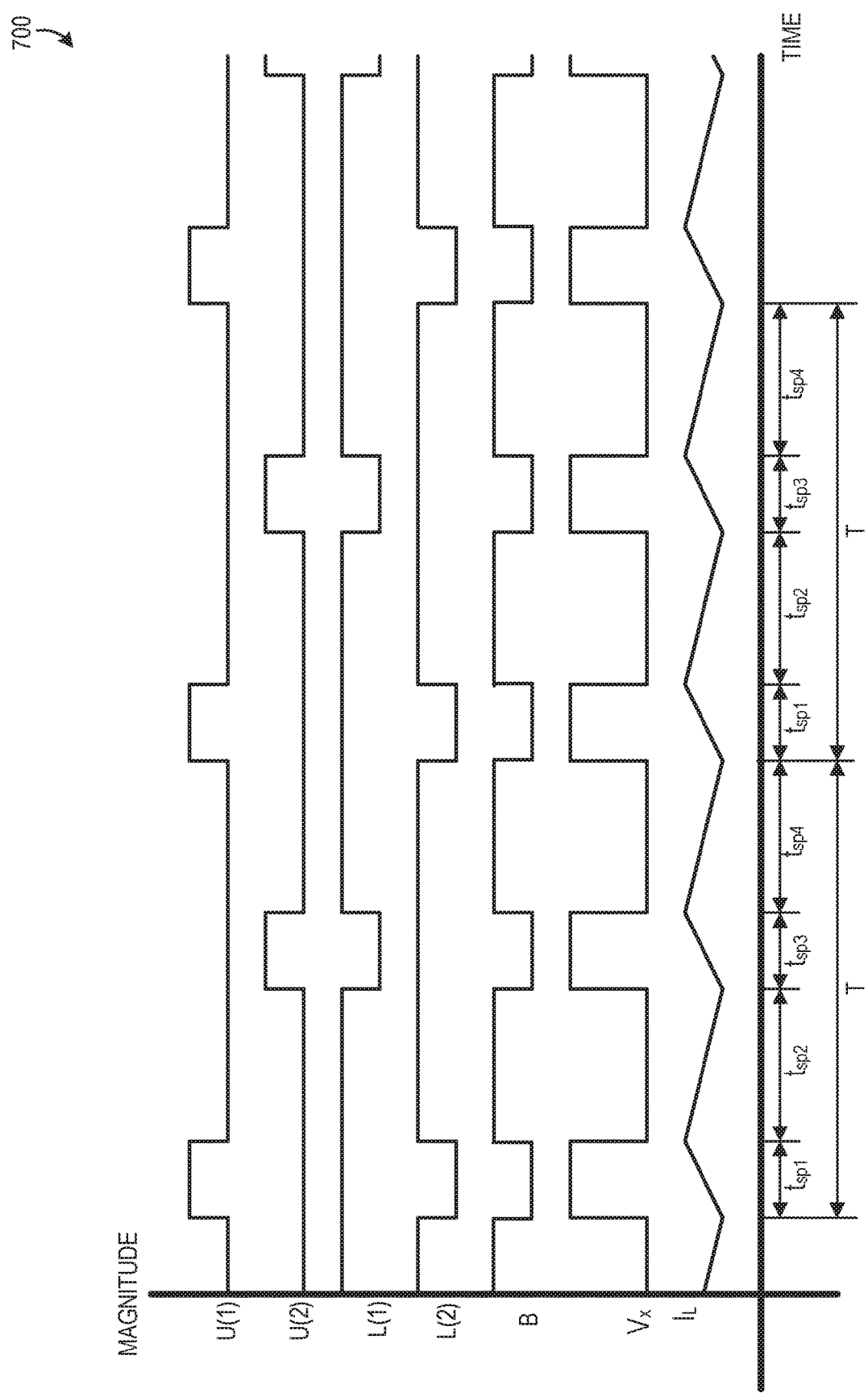
FIG. 7 shows waveforms illustrating one example of operation of the FIG. 6 switching power converter with a duty cycle of upper transistors being about 17%.

Although switching power converter 200 includes three upper transistors 202, three lower transistors 204, and two flying capacitors 206, the number of each of these elements could be varied without departing from the scope hereof. In particular, switching power converter 200 could be modified to have N upper transistors, N lower transistors, and N−1 flying capacitors, where N is an integer greater than one. For example, FIG. 6 illustrates a switching power converter 600 which is like switching power converter 200 of FIG. 2, but where N is two, such that switching power converter 600 includes two upper transistors 202, two lower transistors 204, and one flying capacitor 206. FIG. 7 shows waveforms 700 illustrating one example of operation of switching power converter 600 with duty cycle of upper transistors 202 being about 17%. Each period T only includes four sub-periods $t_{sp1}$ through $t_{sp4}$, instead of the six sub-periods of FIGS. 3 and 4, due switching power converter 600 including two upper transistors 202 instead of four upper transistors 202. Controller 214 asserts bypass control signal B to cause bypass transistor 212 to operate in its on state during each of sub-periods $t_{sp2}$ and $t_{sp4}$, corresponding to when all of the lower transistors 204 are in their respective on states.

Figure 8:
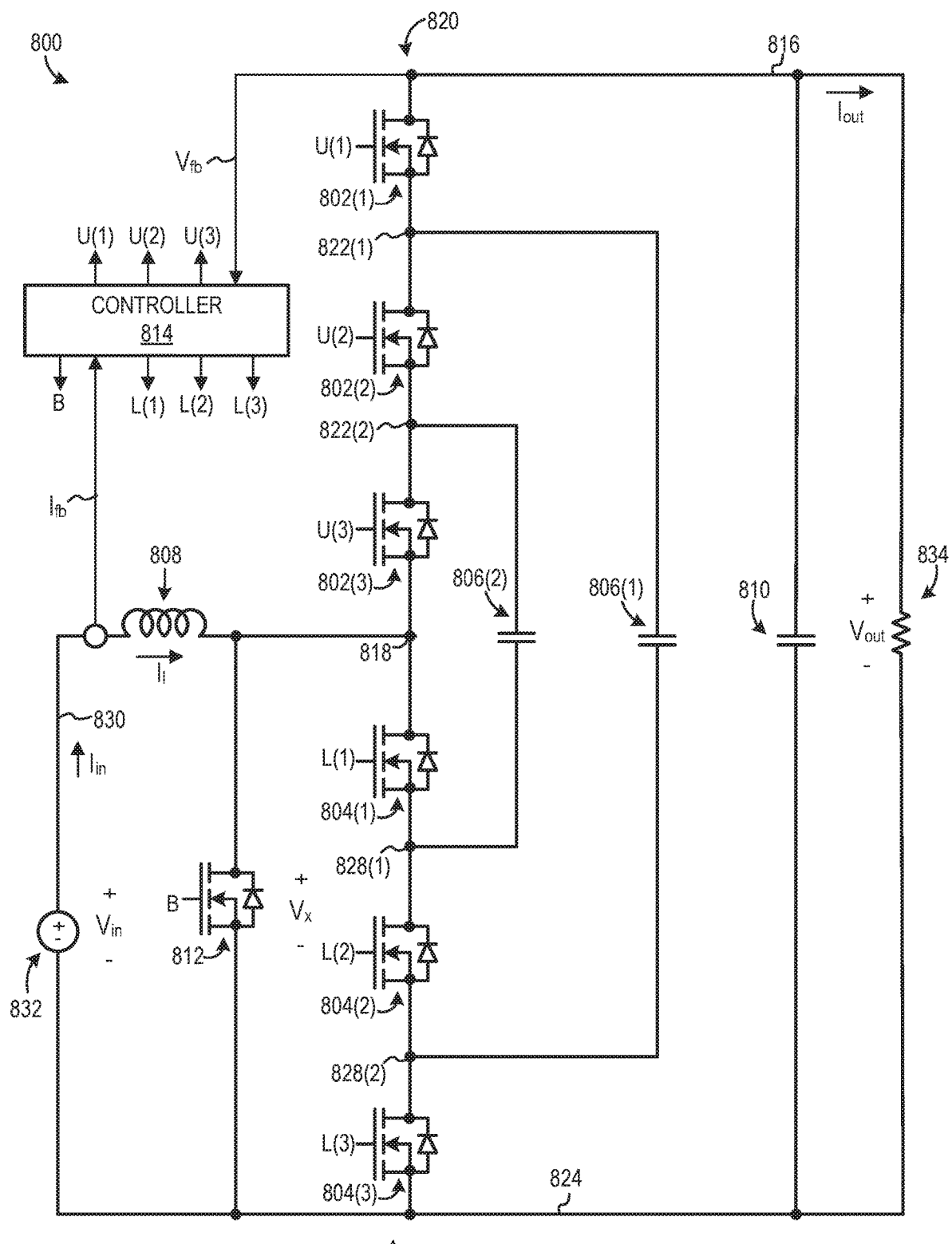
FIG. 8 illustrates a four-level boost switching power converter including a bypass transistor, according to an embodiment.

The multi-level switching power converters disclosed herein could be modified to have a boost topology, instead of a buck topology. For example, FIG. 8 illustrates a four-level boost switching power converter 800 including three upper transistors 802, three lower transistors 804, two flying capacitors 806, an inductor 808, an output capacitor 810, a bypass transistor 812, and a controller 814. Upper transistors 802 are electrically coupled in series between a first power node 816 and a switching node 818 to form an upper string 820. Specifically, first upper transistor 802(1) is electrically coupled between first power node 816 and a first upper node 822(1), second upper transistor 802(2) is electrically coupled between first upper node 822(1) and a second upper node 822(2), and third upper transistor 802(3) is electrically coupled between second upper node 822(2) and switching node 818. Lower transistors 804 are electrically coupled in series between switching node 818 and a reference node 824 to form a lower string 826. Specifically, first lower transistor 804(1) is electrically coupled between switching node 818 and a first lower node 828(1), second lower transistor 804(2) is electrically coupled between first lower node 828(1) and a second lower node 828(2), and third lower transistor 804(3) is electrically coupled between second lower node 828(2) and reference node 824. Although upper transistors 802, lower transistors 804, and bypass transistor 812 are shown as being n-channel enhancement MOSFETs, one or more of these transistors could be replaced with, or supplemented by, a different type of transistor, such as a p-channel enhancement MOSFET or even a bipolar junction transistor (BJT), without departing from the scope hereof.

Each flying capacitor 806 is electrically coupled between a respective upper node 822 of upper string 820 and a respective lower node 828 of lower string 826. In particular, first flying capacitor 806(1) is electrically coupled between first upper node 822(1) and second lower node 828(2), and second flying capacitor 806(2) is electrically coupled between second upper node 822(2) and first lower node 828(1). Inductor 808 is electrically coupled between switching node 818 and a second power node 830, and output capacitor 810 is electrically coupled between first power node 816 and reference node 824. Bypass transistor 812 is electrically coupled in parallel with lower transistors 804 between switching node 818 and reference node 824. An input electric power source 832 having a voltage $V_{in}$ is electrically coupled between second power node 830 and reference node 824, and a load 834 is electrically coupled between first power node 816 and reference node 824. While not required, it is anticipated that input electric power source 832 and load 834 will typically not be part of switching power converter 800.

Controller 814 is configured to generate a respective lower control signal L for each lower transistor 804, to control switching of lower transistors 804. Each lower control signal L controls switching of a respective lower transistor 804 to transfer electric power from input electric power source 832 to load 834. In particular, lower control signal L(1) controls switching of first lower transistor 804(1), lower control signal L(2) controls switching of second lower transistor 804(2), and lower control signal L(3) controls switching of third lower transistor 804(3). Controller 814 is also configured to generate lower control signals L such that each lower transistor 804 switches out of phase with each other lower transistor 804. For example, in certain embodiments, controller 814 generates each lower control signals L 120 degrees out of phase with each other lower control signal L, such that each lower transistor 804 switches 120 degrees out of phase with other lower transistor 804.

In some embodiments, controller 814 is further configured to generate lower control signals L and thereby control switching of lower transistors 804 to regulate at least one of (a) magnitude of voltage $V_{in}$ at second power node 830, (b) magnitude of voltage $V_{out}$ at first power node 816, (c) magnitude of current $I_{in}$, flowing into switching power converter 800, and (d) magnitude of load current $I_{out}$ flowing out of switching power converter 800. Controller 814 achieves such regulation using a PWM or a PFM control technique in response to one or more of a voltage feedback signal $V_{fb}$ and a current feedback signal $I_{in}$, in certain embodiments. In some embodiments, voltage feedback signal $V_{fb}$ represents magnitude of voltage $V_{out}$ at first power node 816 and current feedback signal $I_{fb}$ represents magnitude of current $I_i$ through inductor 808. However, voltage feedback signal $V_{fb}$ and current feedback signal $I_{out}$ could be modified to represent a different voltage and current, respectively. Additionally controller 814 could alternately be configured to achieve regulation using one or more additional or different parameters without departing from the scope hereof.

Upper transistors 802 perform a freewheeling function, i.e., each upper transistor 802 provides a path for current flowing through inductor 808 when a respective lower transistor 804 switches from its on state to its off state. Accordingly, controller 814 is further configured to generate a respective upper control signal U for each upper transistor 802, to control switching of upper transistors 802 such that they perform a freewheeling function. Each upper control signal U controls switching of a respective upper transistor 802. In particular, upper control signal U(1) controls switching of first upper transistor 802(1), upper control signal U(2) controls switching of second upper transistors 802(2), and upper control signal U(3) controls switching of third upper transistor 802(3). Controller 814 is also configured to generate upper control signals U such that each upper transistor 802 switches in a complementary manner with a respective lower transistor 804, except when lower transistors 804 continuously operate in their respective on states, as discussed below. Specifically, controller 814 is configured to generate upper control signals U such that (a) first upper transistor 802(1) switches in a complementary manner with third lower transistor 804(3), (b) second upper transistor 802(2) switches in a complementary manner with second lower transistor 804(2), and (c) third upper transistor 802(3) switches in a complementary manner with first lower transistor 804(1).

Controller 814 is further configured to generate a bypass control signal B to control switching of bypass transistor 812 to cause bypass transistor 812 to operate in its on state in response to all lower transistors 804 operating in their on state. While not required, bypass transistor 812 typically has an on-resistance that is less than a sum of respective on-resistances of lower transistors 804. In these embodiments, bypass transistor 812 provides a relatively low-resistance current path in parallel with lower transistors 804, thereby reducing current flowing through lower transistors 804 and associated power dissipation in lower transistors 804, when all lower transistors 804 are operating in their respective on states. Consequently, use of bypass transistor 812 in switching power converter 800 may enable lower transistors 804 to have a relatively high on-resistance without unduly degrading efficiency of switching power converter 800, thereby promoting low cost and small size of switching power converter 800.

In some embodiments, controller 814 is configured to generate bypass control signal B such that bypass transistor 812 switches from its off state to its on state while one or more of lower transistors 804 switch from their respective off states to their respective on states, such that switching of bypass transistor 812 is synchronized with switching of lower transistors 804. In some other embodiments, however, controller 814 is configured to generate bypass control signal B such that bypass transistor 812 switches at a different time than lower transistors 804. For example, in a particular embodiment, controller 814 is configured to generate bypass control signal B such that (a) bypass transistor 812 switches from its off state to its on state a first amount of time after each lower transistor 804 is operating in its on state and (b) bypass transistor 812 switches from its on state to its off state a second amount of time before one or more lower transistor 804 switches from its on state to its off state. Such offset in switching of bypass transistor 812 relative to switching of lower transistors 804 may minimize switching losses incurred during switching of bypass transistor 812.

Figure 9:
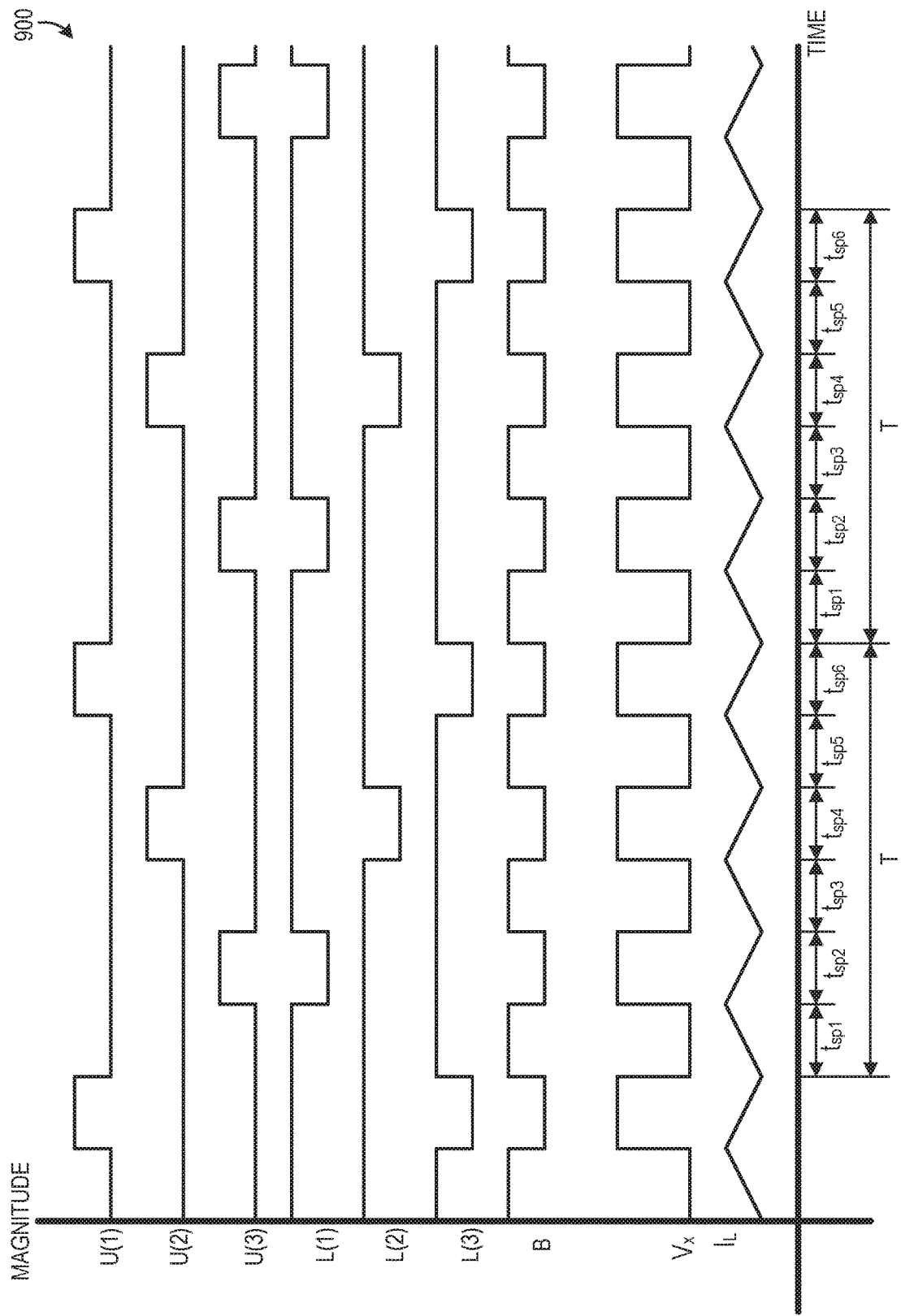
FIG. 9 shows waveforms illustrating one example of operation of the FIG. 8 switching power converter.

FIG. 9 shows waveforms 900 illustrating one example of operation of switching power converter 800 in an application where output voltage $V_{out}$ at first power node 816 satisfies the following inequality, where $V_{max}$ is a maximum value of $V_{out}$: $(0.67*V_{max})<V_{out} \leq V_{max}$. $V_{max}$ is selected, for example, so that voltage across each upper transistor 802 and voltage across each lower transistor 804 does not exceed a respective maximum voltage rating of the transistor. In one embodiment, upper and lower transistors 802 and 804 have a common maximum voltage rating, and $V_{max}$ is three times this maximum voltage rating. In this example, each upper control signal U, each lower control signal L, and bypass control signal B is in its asserted state when it is logic high. Signal $V_x$ represents voltage at switching node 818. Controller 814 generates lower control signals L such that each lower control signal is 120 degrees out of phase with other lower control signal L. Additionally, controller 814 generates upper control signals U such that each upper control signal U is asserted/de-asserted in a complementary manner with a respective lower control signal. For example, upper control signal U(1) is de-asserted when lower control signal L(3) is asserted, and upper control signal U(1) is asserted when lower control signal L(3) is de-asserted.

Controller 814 additionally asserts bypass control signal B solely when all of lower control signals L are asserted, such that bypass transistor 812 is in its on state solely when all of lower transistors 804 are in their respective on states. Consequently, bypass transistor 812 is on in each of sub-periods $t_{sp1}$, $t_{sp3}$, and $t_{sp5}$ of period T. First flying capacitor 806(1) is charged during sub-period $t_{sp4}$ and discharged during sub-period $t_{sp6}$, and second flying capacitors 806(2) is charged during sub-period $t_{sp2}$ and discharged during sub-period $t_{sp4}$. Inductor 808 is charged during each of sub-periods $t_{sp1}$, $t_{sp3}$, and $t_{sp5}$, and inductor 808 is discharged during each of sub-periods $t_{sp2}$, $t_{sp4}$, and $t_{sp6}$.

Figure 10:
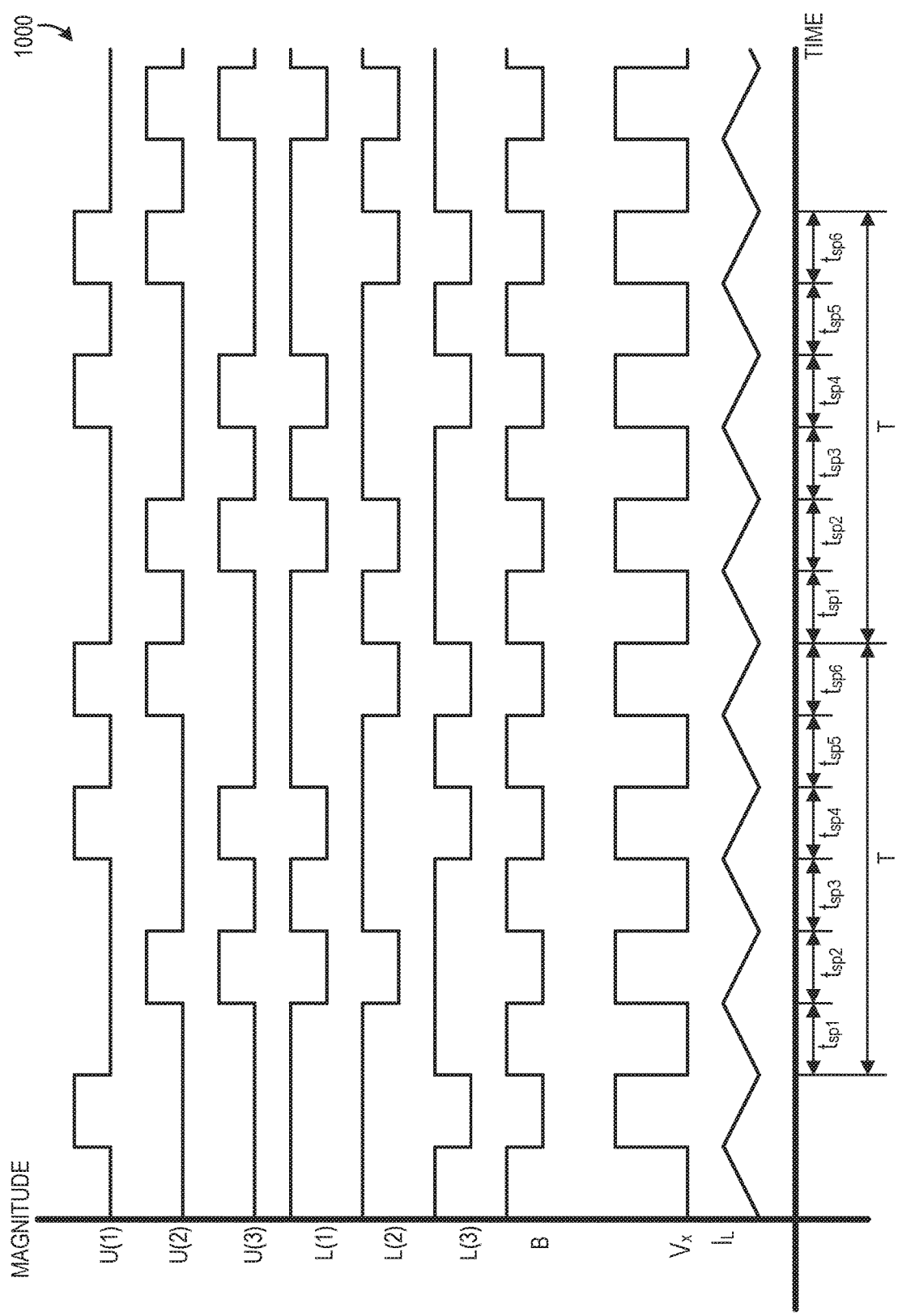
FIG. 10 shows waveforms illustrating another example of operation of the FIG. 8 switching power converter.

FIG. 10 show waveforms 1000 illustrating one example of operation of switching power converter 800 in an application where output voltage $V_{out}$ satisfies the following inequality: $(0.33*V_{max})<V_{out}<(0.67*V_{max})$ In this example, each upper control signal U, each lower control signal L, and bypass control signal B is in it asserted state when it is logic high. Controller 814 generates lower control signals L such that each lower control signal is 120 degree out of phase with other lower control signal and also such that each lower control signal U is asserted twice in each respective period T. Additionally, controller 814 generates upper control signals U such that each upper control signal U is asserted/de-asserted in a complementary manner with a respective lower control signal. For example, upper control signal U(1) is de-asserted when lower control signal L(3) is asserted, and upper control signal U(1) is asserted when lower control signal L(3) is de-asserted.

Controller 814 additionally asserts bypass control signal B solely when all of lower control signals L are asserted, such that bypass transistor 812 is in its on state solely when all of lower transistors 804 are in their respective on states. Consequently, bypass transistor 812 is on in each of sub-periods $t_{sp1}$, $t_{sp3}$, and $t_{sp5}$ of period T. First flying capacitor 806(1) is charged during sub-period $t_{sp2}$ and discharged during sub-period $t_{sp4}$, and second flying capacitors 806(2) is charged during sub-period $t_{sp4}$ and discharged during sub-period $t_{sp6}$. Inductor 808 is charged during sub-periods $t_{sp1}$, $t_{sp3}$, and $t_{sp5}$, and inductor 808 is discharged during sub-periods $t_{sp2}$, $t_{sp4}$, and $t_{sp6}$.

Figure 11:
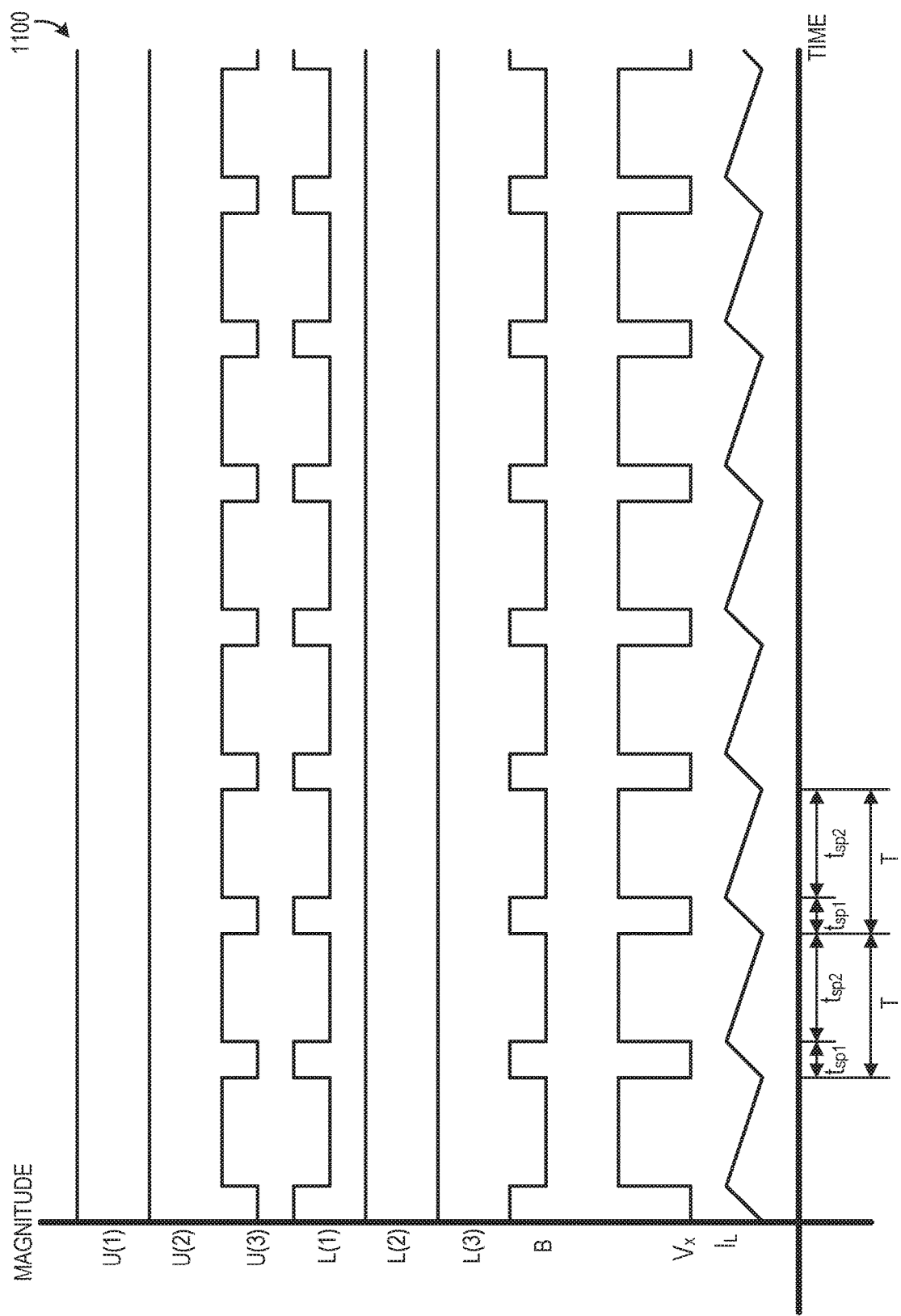
FIG. 11 shows waveforms illustrating yet another example of operation of the FIG. 8 switching power converter.

FIG. 11 shows waveforms 1100 illustrating one example of operation of switching power converter 800 in an application where output voltage $V_{out}$ satisfies the following inequality: $V_{out}<(0.33*V_{max})$ In this example, each upper control signal U, each lower control signal L, and bypass control signal B is in its asserted state when it is logic high. Controller 814 generates upper control signals U(1) and U(2) such that they are continuously asserted to cause each of first upper transistor 802(1) and second upper transistor 802(2) to continuously operate in its on state, such that switching power converter 800 effectively functions as a 2-level switching power converter. Controller 814 generates lower control signal L(1) such that lower control signal L(1) is asserted once in each period T. Additionally, controller 814 generates upper control signal U(3) such that upper control signal U(3) is asserted/de-asserted in a complementary manner with lower control signal L(1). Controller 814 also generates lower control signals L(2) and L(3) such that they are continuously asserted to cause each of second lower transistor 804(2) and third lower transistor 802(3) to continuously operate in its on state.

Controller 814 additionally asserts bypass control signal B solely when all of lower control signals L are asserted, such that bypass transistor 812 is in its on state solely when all of lower transistors 804 are in their respective on states. Consequently, bypass transistor 812 is on in period $t_{sp1}$ of period T. Flying capacitors 806 do not periodically charge and discharge in the FIG. 11 example. Instead, flying capacitors 806 simply serve as output capacitance in parallel with output capacitor 810 in this example.

Similar to switching power converter 200 of FIG. 2, switching power converter 800 could be modified to have N upper transistors, N lower transistors, and N−1 flying capacitors, where N is an integer greater than one. Additionally, in certain embodiments of switching power converter 800, two or more components of the switching power converter are co-packaged. For example, in a particular embodiment, lower transistors 802, upper transistors 804, and bypass transistor 812 are formed on a common silicon substrate within an integrated circuit package, similar to that illustrated in FIG. 5.

Figure 12:
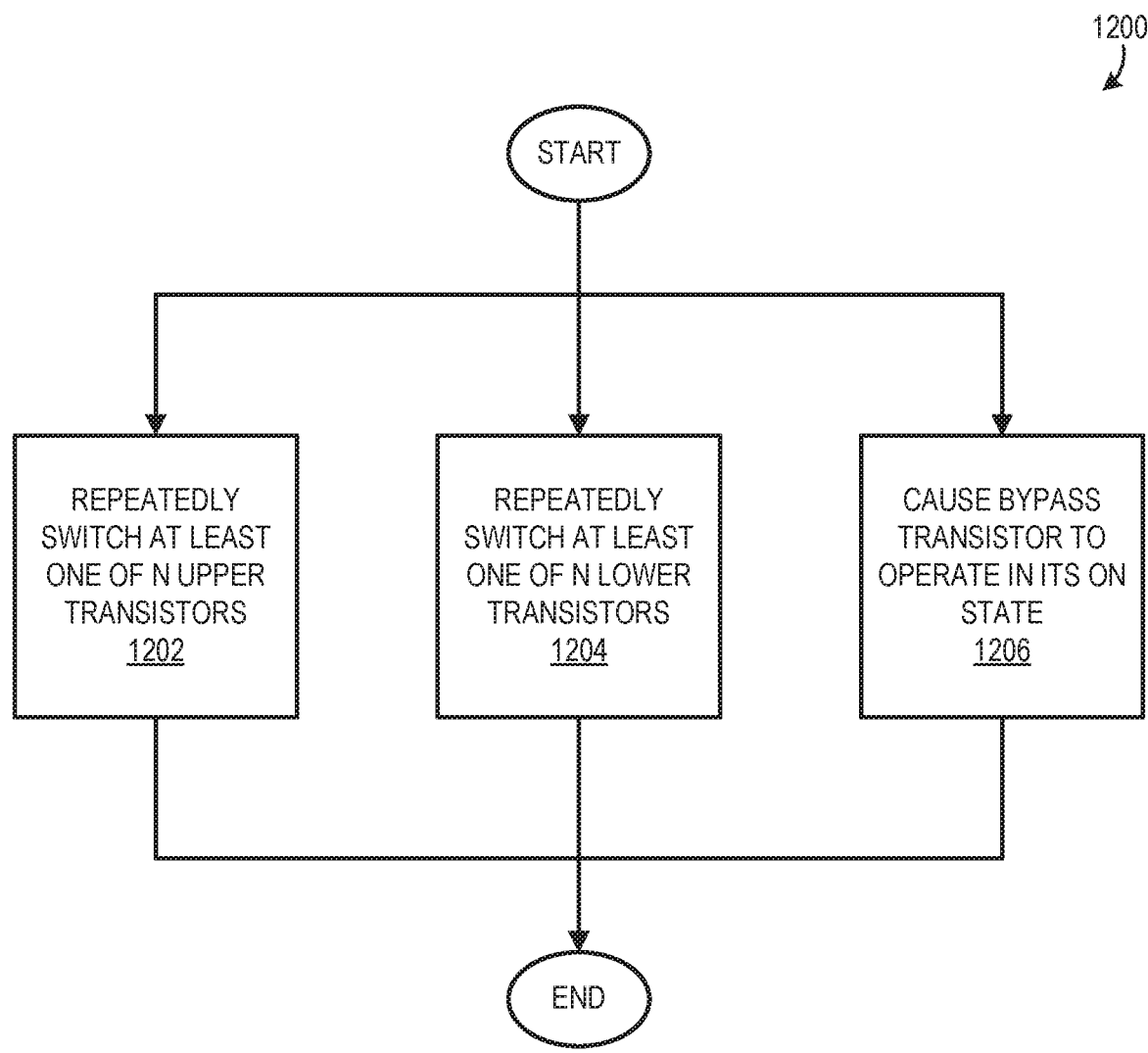
FIG. 12 illustrates a method for operating a multi-level switching power converter, according to an embodiment.

FIG. 12 illustrates a method 1200 for operating a multi-level switching power converter. In step 1202 at least one of N upper transistors is repeatedly switched, where the N upper transistors are electrically coupled in series and N is an integer greater than one. In one example of step 1202, controller 214 generates upper control signals U to cause upper transistors 202 to switch out of phase with each other. In another example of step 1202, controller 814 generates upper control signals U to cause each upper transistor 802 to switch in a complementary manner with a respective lower transistor 804. In step 1204, at least one of N lower transistors is repeatedly switched, where the N lower transistors are electrically coupled in series. In one example of step 1204, controller 214 generates lower control signals L to cause each lower transistor 204 to switch in a complementary manner with a respective upper transistor 202. In another example of step 1204, controller 814 generates lower control signals L to cause lower transistors 804 to switch out of phase with each other.

In step 1206, a bypass transistor electrically coupled in parallel with the N lower transistors is caused to operate in its on state to bypass the N lower transistors, in response to all of the N lower transistors operating in their respective on states. In one example of step 1206, controller 214 causes bypass transistor 212 to operate in its on state in response to all of lower transistors 204 operating in their respective on states. In another example of step 1206, controller 814 causes bypass transistor 812 to operate in its on state in response to all of lower transistors 804 operating in their respective on states.

Combinations of Features

Features described above may be combined in various ways without departing from the scope hereof. The following examples illustrate some possible combinations:

(A1) A multi-level switching power converter may include (1) a string of N upper transistors electrically coupled in series between a first power node and a switching node, N being an integer greater than one, (2) a string of N lower transistors electrically coupled in series between the switching node and a reference node, (3) N−1 flying capacitors, each flying capacitor electrically coupled between (a) a respective node of the string of N upper transistors and (b) a respective node of the string of N lower transistors, (4) an inductor electrically coupled between the switching node and a second power node, (5) a bypass transistor electrically coupled in parallel with the string of N lower transistors between the switching node and the reference node, and (6) a controller configured to (a) control switching of the N upper transistors and the N lower transistors and (b) cause the bypass transistor to operate in its on state in response to all of the N lower transistors operating in their respective on states.

(A2) In the multi-level switching power converter denoted as (A1), the controller may be further configured to control switching of the N upper transistors to regulate at least one of (a) magnitude of voltage at the first power node, (b) magnitude of voltage at the second power node, (c) magnitude of current flowing into the multi-level switching power converter, and (d) magnitude of current flowing out of the multi-level switching power converter.

(A3) In any one of the multi-level switching power converters denoted as (A1) and (A2), the controller may be further configured to limit a duty cycle of the N upper transistors to less than 1/N.

(A4) In any one of the multi-level switching power converters denoted as (A1) through (A3), the bypass transistor may have an on-resistance that is less than a sum of respective on-resistances of the N lower transistors.

(A5) In any one of the multi-level switching power converters denoted as (A1) through (A4), each of the N upper transistors, each of the N lower transistors, and the bypass transistor may be housed in a common integrated circuit package.

(A6) In the multi-level switching power converter denoted as (A5), each of the N upper transistors, each of the N lower transistors, and the bypass transistor may be formed in a common silicon substrate.

(A7) In any one of the multi-level switching power converters denoted as (A1) through (A6), the multi-level switching power converter may have a buck topology.

(A8) The multi-level switching power converter denoted as (A7) may further include an output capacitor electrically coupled between the second power node and the reference node.

(A9) In any one of the multi-level switching power converters denoted as (A1) through (A8), the controller may be further configured to cause each of the N lower transistors to switch in a complementary manner with a respective one of the N upper transistors.

(A10) In any one of the multi-level switching power converters denoted as (A1) through (A6), the multi-level switching power converter may have a boost topology.

(A11) The multi-level switching power converter denoted as (A10) may further include an output capacitor electrically coupled between the first power node and the reference node.

(A12) In any one of the multi-level switching power converters denoted as (A10) and (A11), the controller may be further configured to cause each of the N upper transistors to switch in a complementary manner with a respective one of the N lower transistors.

(A13) In any one of the multi-level switching power converters denoted as (A1) through (A12), (1) N may be equal to 3, (2) the N upper transistors may include a first upper transistor electrically coupled between the first power node and a first upper node, a second upper transistor electrically coupled between the first upper node and a second upper node, and a third upper transistor electrically coupled between the second upper node and the switching node, (3) the N lower transistors may include a first lower transistor electrically coupled between the switching node and a first lower node, a second lower transistor electrically coupled between the first lower node and a second lower node, and a third lower transistor electrically coupled between the second lower node and the reference node, and (4) the N−1 flying capacitors may include a first flying capacitor electrically coupled between the first upper node and the second lower node and a second flying capacitor electrically coupled between the second upper node and first lower node.

(A14) In any one of the multi-level switching power converters denoted as (A1) through (A12), (1) N may be equal to 2, (2) the N upper transistors may include a first upper transistor electrically coupled between the first power node and a first upper node and a second upper transistor electrically coupled between the first upper node and the switching node, (3) the N lower transistors may include a first lower transistor electrically coupled between the switching node and a first lower node and a second lower transistor electrically coupled between the first lower node and the reference node, and (4) the N−1 flying capacitors may include a first flying capacitor electrically coupled between the first upper node and the first lower node.

(B1) A method for operating a multi-level switching power converter may include (1) repeatedly switching at least one of N upper transistors, the N upper transistors being electrically coupled in series, N being an integer greater than one, (2) repeatedly switching at least one of N lower transistors, the N lower transistors being electrically coupled in series, and (3) in response to all of the N lower transistors operating in their respective on states, causing a bypass transistor electrically coupled in parallel with the N lower transistors to operate in its on state.

(B2) The method denoted as (B1) may further include repeatedly charging and discharging each of (a) N−1 flying capacitors and (b) an inductor, to transfer electric power between an input electric power source and a load.

(B3) In any one of the methods denoted as (B1) and (B2), the step of repeatedly switching at least one of N upper transistors may include repeatedly switching each of N upper transistors out of phase with each other, and the step of repeatedly switching at least one of N lower transistors may include repeatedly switching each of N lower transistors in a complementary manner with a respective one of the N upper transistors.

(B4) In the method denoted as (B3), the step of the repeatedly switching at least one of the N upper transistors may include switching least one of the N upper transistors in manner to regulate at least one of (a) magnitude of an input voltage of the multi-level switching power converter, (b) magnitude of an output voltage of the multi-level switching power converter, (c) magnitude of current flowing into the multi-level switching power converter, and (d) magnitude of current flowing out of the multi-level switching power converter.

(B5) In any one of the methods denoted as (B3) and (B4), the multi-level switching power converter may have a buck topology.

(B6) In any of the methods denoted as (B1) and (B2), the step of repeatedly switching at least one of N lower transistors comprises repeatedly switching each of N lower transistors out of phase with each other, and the step of repeatedly switching at least one of N upper transistors comprises repeatedly switching each of N upper transistors in a complementary manner with a respective one of the N lower transistors.

(B7) In the method denoted as (B6), the step of the repeatedly switching at least one of the N lower transistors may include switching least one of the N lower transistors in manner to regulate at least one of (a) magnitude of an input voltage of the multi-level switching power converter, (b) magnitude of an output voltage of the multi-level switching power converter, (c) magnitude of current flowing into the multi-level switching power converter, and (d) magnitude of current flowing out of the multi-level switching power converter.

(B8) In any one of the methods denoted as (B6) and (B7), the multi-level switching power converter may have a boost topology.

(B9) Any one of methods denoted as (B1) through (B8) may further include limiting a duty cycle of the N upper transistors to less than 1/N.

(B10) In any one of the methods denoted as (B1) through (B9), the step of causing the bypass transistor electrically coupled in parallel with the N lower transistors to operate in its on state may include switching the bypass transistor from its off state to its on state after each of the N lower transistors is operating in its on state.

(B11) In any one of the methods denoted as (B1) through (B9), the step of causing the bypass transistor electrically coupled in parallel with the N lower transistors to operate in its on state may include switching the bypass transistor from its off state to its on state while switching one or more of the N lower transistors from their respective off states to their respective on states.

Changes may be made in the above multi-level switching power converters and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present multi-level switching power converters and methods, which, as a matter of language, might be said to fall therebetween.

What is claimed is:

1. A multi-level switching power converter, comprising:
    a string of N upper transistors electrically coupled in series between a first power node and a switching node, N being an integer greater than one;
    a string of N lower transistors electrically coupled in series between the switching node and a reference node;
    N−1 flying capacitors, each flying capacitor electrically coupled between (a) a respective node of the string of N upper transistors and (b) a respective node of the string of N lower transistors, each flying capacitor being separated from the first power node by at least one of the N upper transistors, and each flying capacitor being separated from the reference node by at least one of the N lower transistors;
    an inductor electrically coupled between the switching node and a second power node;
    a bypass transistor electrically coupled in parallel with the string of N lower transistors between the switching node and the reference node, such that the bypass transistor provides a current path in parallel with the string of N lower transistors when the bypass transistor is operating in its on state; and
    a controller configured to (a) control switching of the N upper transistors and the N lower transistors and (b) cause the bypass transistor to operate in its on state in response to all of the N lower transistors operating in their respective on states.

2. The multi-level switching power converter of claim 1, wherein the controller is further configured to control switching of the N upper transistors to regulate at least one of (a) magnitude of voltage at the first power node, (b) magnitude of voltage at the second power node, (c) magnitude of current flowing into the multi-level switching power converter, and (d) magnitude of current flowing out of the multi-level switching power converter.

3. The multi-level switching power converter of claim 1, wherein the controller is further configured to limit a duty cycle of the N upper transistors to less than 1/N.

4. The multi-level switching power converter of claim 1, the bypass transistor having an on-resistance that is less than a sum of respective on-resistances of the N lower transistors.

5. The multi-level switching power converter of claim 1, each of the N upper transistors, each of the N lower transistors, and the bypass transistor being housed in a common integrated circuit package.

6. The multi-level switching power converter of claim 1, the multi-level switching power converter having a buck topology.

7. The multi-level switching power converter of claim 1, wherein the controller is further configured to cause each of the N lower transistors to switch in a complementary manner with a respective one of the N upper transistors.

8. The multi-level switching power converter of claim 1, the multi-level switching power converter having a boost topology.

9. The multi-level switching power converter of claim 8, wherein the controller is further configured to cause each of the N upper transistors to switch in a complementary manner with a respective one of the N lower transistors.

10. The multi-level switching power converter of claim 1, wherein:
   N is equal to 3;
   the N upper transistors comprise:
      a first upper transistor electrically coupled between the first power node and a first upper node,
      a second upper transistor electrically coupled between the first upper node and a second upper node, and
      a third upper transistor electrically coupled between the second upper node and the switching node;
   the N lower transistors comprise:
      a first lower transistor electrically coupled between the switching node and a first lower node,
      a second lower transistor electrically coupled between the first lower node and a second lower node, and
      a third lower transistor electrically coupled between the second lower node and the reference node; and
   the N−1 flying capacitors comprise:
      a first flying capacitor electrically coupled between the first upper node and the second lower node, and
      a second flying capacitor electrically coupled between the second upper node and first lower node.

11. The multi-level switching power converter of claim 1, wherein:
   N is equal to 2;
   the N upper transistors comprise:
      a first upper transistor electrically coupled between the first power node and a first upper node, and
      a second upper transistor electrically coupled between the first upper node and the switching node;
   the N lower transistors comprise:
      a first lower transistor electrically coupled between the switching node and a first lower node, and
      a second lower transistor electrically coupled between the first lower node and the reference node; and
   the N−1 flying capacitors comprise a first flying capacitor electrically coupled between the first upper node and the first lower node.

12. A method for operating a multi-level switching power converter, comprising:
   repeatedly switching at least one of N upper transistors, the N upper transistors being electrically coupled in series, N being an integer greater than one;
   repeatedly switching at least one of N lower transistors, such that each of the N lower transistors is switched in a complementary manner with a respective one of the N upper transistors, the N lower transistors being electrically coupled in series; and
   in response to all of the N lower transistors operating in their respective on states, causing a bypass transistor electrically coupled in parallel with the N lower transistors to operate in its on state, to provide a current path in parallel with the N lower transistors.

13. The method of claim 12, further comprising repeatedly charging and discharging each of (a) N−1 flying capacitors and (b) an inductor, to transfer electric power between an input electric power source and a load.

14. The method of claim 12, wherein:
   the step of repeatedly switching at least one of N upper transistors comprises repeatedly switching each of N upper transistors out of phase with each other.

15. The method of claim 14, the multi-level switching power converter having a buck topology.

16. The method of claim 12, further comprising limiting a duty cycle of the N upper transistors to less than 1/N.

17. The method of claim 12, the step of causing the bypass transistor electrically coupled in parallel with the N lower transistors to operate in its on state comprising switching the bypass transistor from its off state to its on state after each of the N lower transistors is operating in its on state.

18. The method of claim 12, the step of causing the bypass transistor electrically coupled in parallel with the N lower transistors to operate in its on state comprising switching the bypass transistor from its off state to its on state while switching one or more of the N lower transistors from their respective off states to their respective on states.

\* \* \* \* \*